United States Patent [19]

Lange et al.

[11] 4,424,576
[45] Jan. 3, 1984

[54] MAINTENANCE PANEL FOR COMMUNICATING WITH AN AUTOMATED MAINTENANCE SYSTEM

[75] Inventors: Ronald E. Lange, Phoenix; Robert J. Koegel, Glendale, both of Ariz.

[73] Assignee: Honeywell Information Systems Inc., Phoenix, Ariz.

[21] Appl. No.: 75,771

[22] Filed: Sep. 17, 1979

[51] Int. Cl.³ .......................................... G01R 31/28
[52] U.S. Cl. ...................................... 364/900; 371/16
[58] Field of Search ... 364/200 MS File, 900 MS File; 371/15, 16, 17, 18, 20

[56] References Cited
U.S. PATENT DOCUMENTS

| | | | |
|---|---|---|---|
| Re. 30,037 | 6/1979 | Bass | 364/900 X |
| 3,813,531 | 5/1974 | King et al. | 371/17 |
| 3,831,148 | 8/1974 | Greenwald et al. | 364/200 |
| 3,909,802 | 9/1975 | Cassarino, Jr. et al. | 364/200 |
| 3,916,177 | 10/1975 | Greenwald | 371/16 |
| 4,034,194 | 7/1977 | Thomas et al. | 371/18 |
| 4,057,847 | 11/1977 | Lowell et al. | 364/200 |
| 4,142,243 | 2/1979 | Bishop et al. | 364/900 |
| 4,194,113 | 3/1980 | Fulks et al. | 371/20 |
| 4,200,224 | 4/1980 | Flint | 371/18 |
| 4,204,253 | 5/1980 | van den Hanenberg et al. | 364/200 |

*Primary Examiner*—Jerry Smith
*Assistant Examiner*—Thomas M. Heckler
*Attorney, Agent, or Firm*—L. D. Burton; W. W. Holloway, Jr.; L. J. Marhoefer

[57] ABSTRACT

Apparatus for entering encoded data, command, and address information via a keyboard for transfer to an automated maintenance system designed to perform certain tests on or cause selected events in a unit of a data processing system such as the central processing unit. The data, command and address information entered via the keyboard by an operator serves to control the tests performed by or the events caused by the automated maintenance system. The maintenance panel also includes a plurality of display devices for displaying the data, command and address information sent to the automated maintenance system as well as data received by the automated maintenance system from the unit under test indicating the correctness of its performance. In the preferred embodiment, several LED indicators are also used for prompting and status indication. Some of these LED's light under the control of the automated maintenance system to provide prompting to the operator to cause him to enter information necessary for completion of a particular command he has entered via the keyboard. Such additional information depends upon the command entered and might include the data he desires to write to a particular register or memory location or the address of a particular memory location he wishes to read. The other LED's indicate the status of the system such as whether an operation is complete or whether the remote terminal port has been enabled. In the preferred embodiment, a hexadecimal encoded keyboard is used for entering data, addresses and commands, while eight function keys serve to control various operations by the automated maintenance system.

6 Claims, 11 Drawing Figures

DATA

ADDRESS

COMMAND

MAINTENANCE PANEL FOR COMMUNICATING WITH AN AUTOMATED MAINTENANCE SYSTEM

BACKGROUND OF THE INVENTION

Most of today's large computer systems need provisions for rapid, low cost trouble shooting of hardware failures in the system. Some have complex arrangements of switches and display apparatus connected with the logic of the unit itself for switching in data, addresses and commands and displaying internal conditions in the machine. Typically these maintenance panel arrangements allow a field engineer to read data from and write data to registers and memory locations, to supply addresses, set fault conditions, set flags, control display functions, check the condition of various control points, check the status of the system and, in general, trace functioning of the system through each step of each machine instruction. Prior art maintenance panels sometimes consisted of long strings of toggle switches for entering data and addresses, and long strings of LED indicators for display of data. Separate command switches were generally required to select timing margins, select the registers or control points to be displayed and to cause the processor to execute commands set into the data switches or enter a single step mode. Entering data, commands and addresses via the prior art maintenance panels, and displaying data relating to the performance of the machine using these prior maintenance panels was time consuming and cumbersome.

Servicing computer systems is now the fastest growing segment of the computer industry according to a recent article in Business Week. A major reason is the spread of distributed processing which is resulting in computer hardware located everywhere. With computer terminals spread throughout a company, very often the data processing system is the central nervous system of the organization. Computer users are now very often less concerned with price performance ratios than with service turnaround time.

The testing apparatus disclosed herein, is designed to replace prior art maintenance panels with microprocessor technology to streamline field engineering and reduce the manufacturing cost of data processing units in which the testing apparatus is incorporated. The system disclosed is incorporated into the structure of the central processing unit or other unit in the data processing system, and has an external interface for control of the testing apparatus from the external world. The preferred embodiment can be controlled from either a portable maintenance panel as described herein and held in the hand of a field engineer or from a computer terminal located in the vicinity of the tested unit or from a computer terminal located anywhere in the world and coupled to the testing apparatus via a communications network. The possibility exists for interface of the testing apparatus to another digital computer programmed to run a predetermined series of tests on the tested unit from a centrally located field engineering office for rapid and accurate pinpointing of defects in the tested unit. The disclosed testing apparatus thereby enables the mainframe computer manufacturer to maintain a staff of highly trained maintenance specialists in a central location close to the manufacturing plant with the capability of servicing computer systems all over the world. This enhanced maintenance capability both decreases field engineering costs enabling lower hardware costs to the customers, and provides better maintenance support to those customers.

The invention relates to subject matter disclosed in the copending patent application "Microprocessor Based Maintenance System", Ser. No. 75,773, filed on Sept. 17, 1979, now U.S. Pat. No. 4,308,615, and invented by ROBERT J. KOEGEL, RONALD E. LANGE, and TERRY L. DAVIS.

SUMMARY OF THE INVENTION

The invention relates generally to the field of digital computers, and more specifically to the field of digital automatic testing apparatus.

Broadly speaking, the invention comprises a keyboard means for entering encoded information to be transferred to the automated maintenance system to control the function of that system. A plurality of display means displays the address, data and command code information sent to the automated maintenance system to control it, and displays data received by the maintenance system from the unit under test, said data indicating the correctness of the performance by the unit under test. A port means coupled to the keyboard means and the display means interfaces with the automated maintenance system to carry data from the unit under test back to the maintenance panel for display by the display means and carry encoded information to the automated maintenance system to control it. The port means also carries address information to the maintenance panel from the automated maintenance system which indicates to the maintenance panel which of the plurality of display means is to display the data from the unit under test indicating the correctness of its performance.

The use of a hexadecimal encoded keyboard and single button function keys for controlling all operations of the maintenance system eliminates the necessity of manipulating long strings of toggle switches used in prior art maintenance panels for entering data, addresses and commands in binary form. The use of LED matrix display devices also speeds up the maintenance process by allowing the field engineer to read the contents of memory location and registers in octal form as opposed to binary form and likewise for the address and command information.

DESCRIPTION OF THE PREFERRED EMBODIMENT

Figure 1:
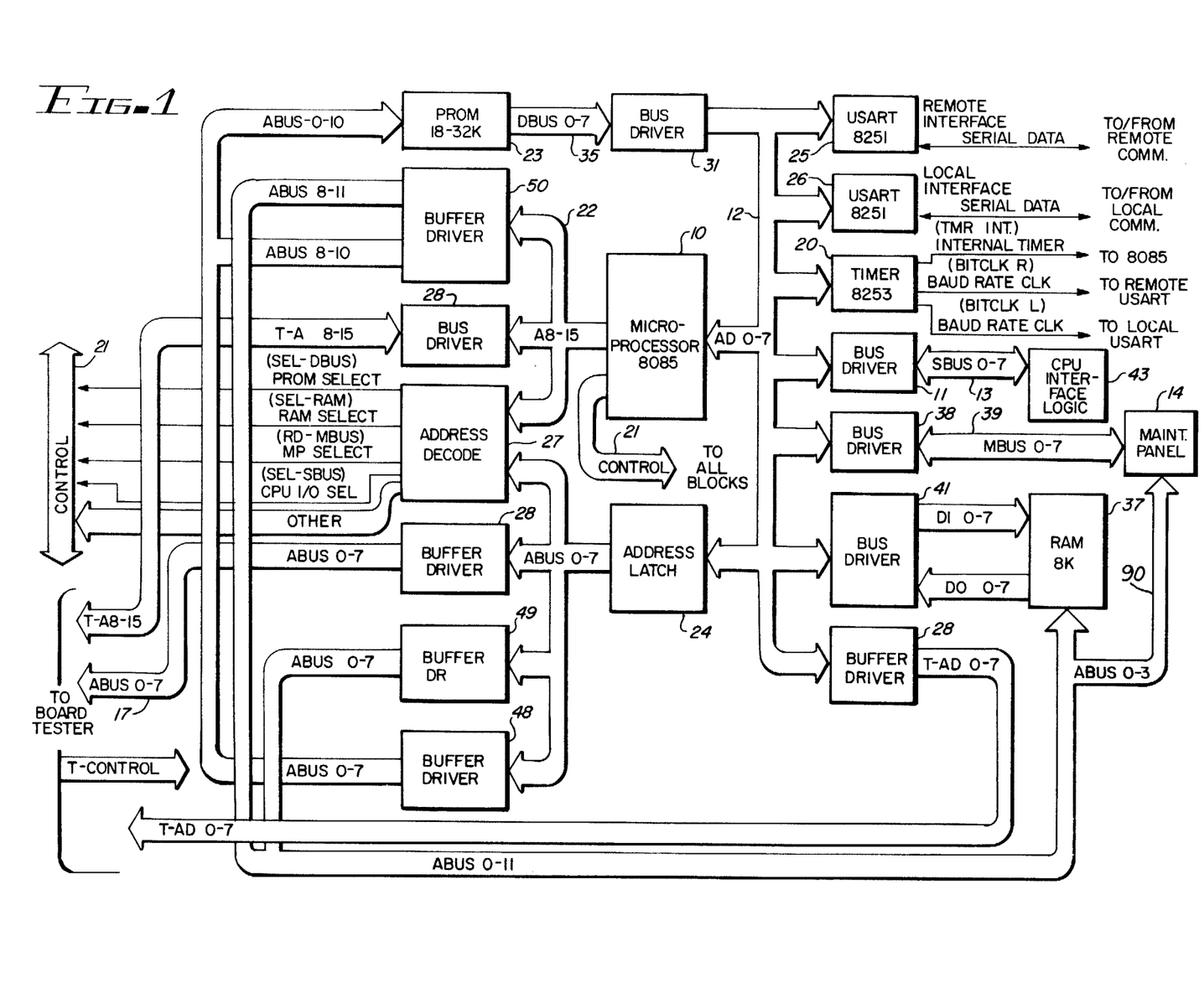
FIG. 1 is an overall block diagram of the automated maintenance system of which maintenance panel 14 is a part.

FIG. 1 shows an overall block diagram of the automated maintenance system of which maintenance panel 14 is a part. Microprocessor 10, under the control of firmware embodied in PROM 23 performs whatever test is ordered by the operator via the keyboard of maintenance panel 14. The overall system shown in FIG. 1 is capable of fully exercising the central processing unit or some other unit of a data processing system. The automated maintenance system shown in FIG. 1 can be adapted to exercise any particular unit in a data processing system by designing a unique interface logic 43 for the desired unit. While the present application is directed only to the Maintenance Panel 14 shown in FIG. 1 as MAINT. PANEL, it should be clear that the said Maintenance Panel is a part of a Microprocessor Based Maintenance System, the overall basic block diagram of which is shown in FIG. 1. For a more detailed description of the Microprocessor Based Maintenance System, the copending patent application entitled "Microprocessor Based Maintenance System", Ser. No. 75,773, filed on Sept. 17, 1979, now U.S. Pat. No. 4,308,615, invented by ROBERT J. KOEGEL, RONALD E. LANGE, and TERRY L. DAVIS is hereby incorporated by reference.

Figure 2:
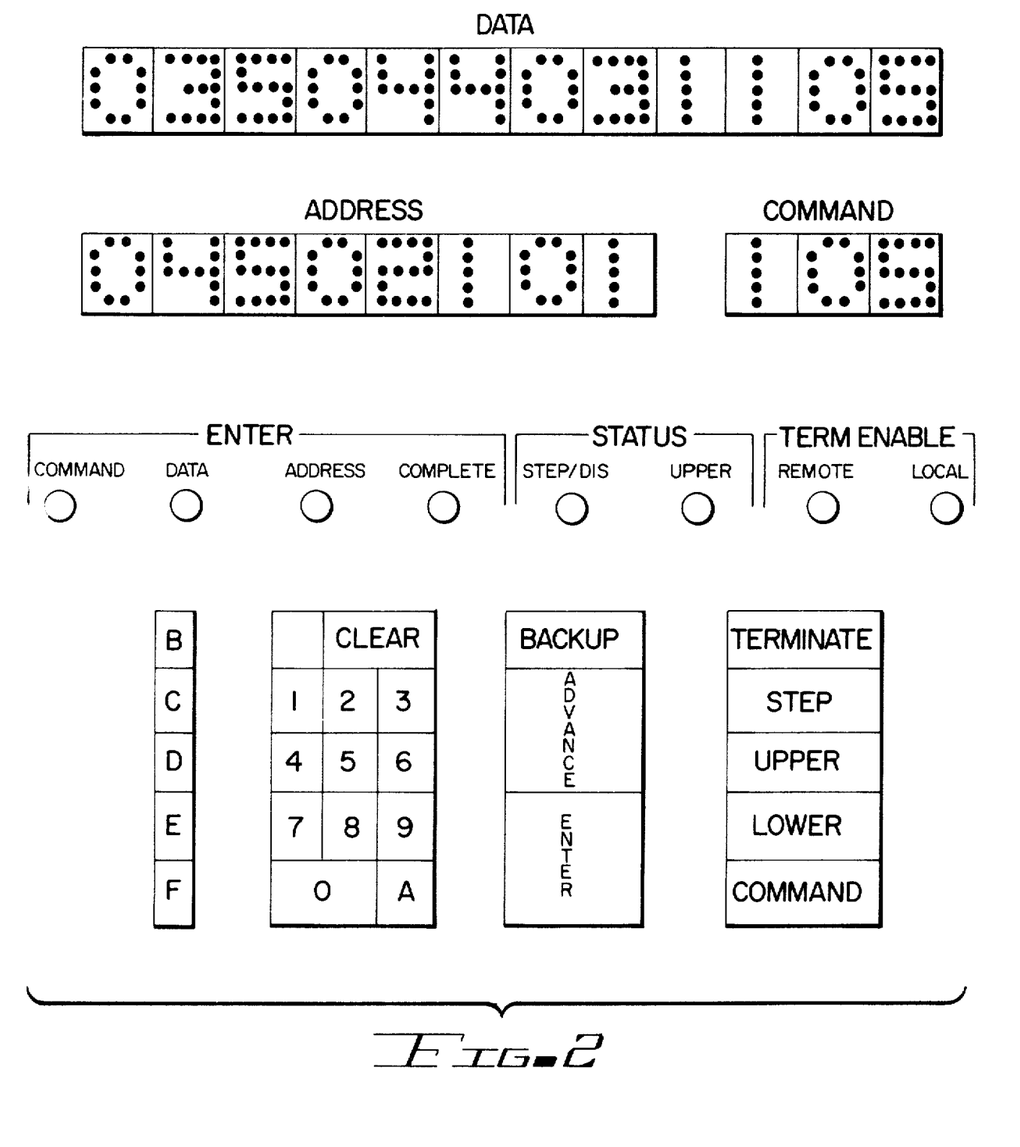
FIG. 2 is a drawing of the front of the maintenance panel showing the display devices, encoded data keyboard and function keys.

FIG. 2 shows the arrangement of the front panel of maintenance panel 14. The panel features a twenty-six key keyboard having sixteen alphanumeric keys for entry of data, commands and address information and nine function keys for providing control information to microprocessor 10 in FIG. 1.

The panel also features a thirty-six bit octal data display, a twenty-four bit octal address display and a twelve bit hexadecimal command display. In addition, there are eight discrete LED indicators which prompt the operator and provide system condition status. Their function can best be explained in conjunction with an explanation of the operation of the maintenance panel.

The nine function keys provide the following control information. The "command" key initiates entry of a specific command or function. When the operator desires that a particular test be performed or a particular event be caused in the unit under test, he depresses this key. This notifies microprocessor 10 that a new command is to be entered. The microprocessor responds by lighting the "command" indicator LED. The operator then looks up the command code for the particular test to be performed and enters this code using the alphanumeric keyboard. As the command code is keyed in, it also shifts into the "command" display. When the operator is satisfied that he has keyed in the proper command code, he depresses the "enter" key. At that time, the command indicator LED is extinguished and another prompting indicator will light depending upon which command was entered. For example, if the command ordered data to be written to a specific register, microprocessor 10 would light the "data" indicator LED to prompt the operator to enter the data to be witten. As the operator keys in the necessary data, it is shifted into the "data" display. When the operator is satisfied that the correct data has been keyed in, he would again depress the "enter" key and microprocessor 10 would read the data via MBUS 39 in FIG. 1 and store it in the desired register. The microprocessor would then light the "address" LED prompting the operator to enter the address to which the previously entered data is to be written using the alphanumeric keyboard.

If the command is to examine a particular memory location, the microprocessor 10 lights the "address" LED after entry of the command. The operator would then key in the address desired. This address would shift into the "address" display as it is keyed in. When the operator is satisfied that he has entered the proper address, he depresses the "enter" key. The microprocessor then retrieves the data in that location and displays it in the "data" display. The microprocessor assumes that new data is to be written to the location unless the "terminate" key is depressed, and lights the "data" LED. New data is then keyed in and simultaneously displayed in the "data" displayed. When satisfied, "enter" is depressed and the new data is written to the location displayed in the "address" display.

Some functions performed by the maintenance system involve reading or writing to main memory locations. The "backup" and "advance" keys are used in such operations to step through memory one location at a time in either direction from a starting address keyed in via the alphanumeric keyboard.

Some functions of the automated maintenance system require that seventy-two bits of information be displayed in monitoring the performance of the unit under test. When such a seventy-two bit display is selected by a particular command code, only thirty-six of the bits may be displayed at any one time in the data display. Initially, the maintenance panel selects the thirty-six most significant bits for display. To indicate this fact, microprocessor 10 lights the "upper" indicator LED. The thirty-six least significant bits may be displayed by depression of the "lower" key, whereupon the "upper" indicator LED is extinguished. Depressing the "upper" key, causes the data display to again display the thirty-six most significant bits.

Typically, the unit under test by the automated maintenance system is the central processing unit of a data processing system. These CPU's are generally comprised of several subunits such as the control unit, operations unit, decimal unit and virtual unit. Each may be placed in a step mode so that internal operations may be performed one step at a time during overall operation of the machine. The automated maintenance system of FIG. 1 is capable of placing each individual subunit of the microprocessor in the step mode via specific command codes. The operator may then cause that unit to perform its operation one step at a time by depressing the "step" key on maintenance panel 14. The particular unit which is selected for the step mode is controlled by setting a particular step function bit in a data word to one after entering the step function command code. The "step" key is disabled by entering the select step mode command code again and resetting the particular step function bit to zero followed by pressing the "step" key.

The "terminate" key will terminate the display functions where the operator does not wish to write new data into the location displayed. Te firmware embodied in PROM 23 of FIG. 1 is structured to display the information which is in a particular address first before requesting new data to be written in the displayed location. Unless the "terminate" key is depressed, the firmware will assume that the operator desires to write new information into the display location.

Finally, the "STEP DIS" status indicator LED tells the operator whether the unit under test is in the step mode or in the DIS state. In the preferred embodiment, the maintenance system is used for testing a central processing unit which sometimes enters the DIS state from which there is no exit exept by interrupt.

The "remote" and "local" terminal enable indicator LED's indicate to the operator when the remote terminal interface is enabled allowing communication between the automated maintenance system and a remote terminal coupled to it by a long-distance communication network. Similarly for the local indicator.

Figure 3:
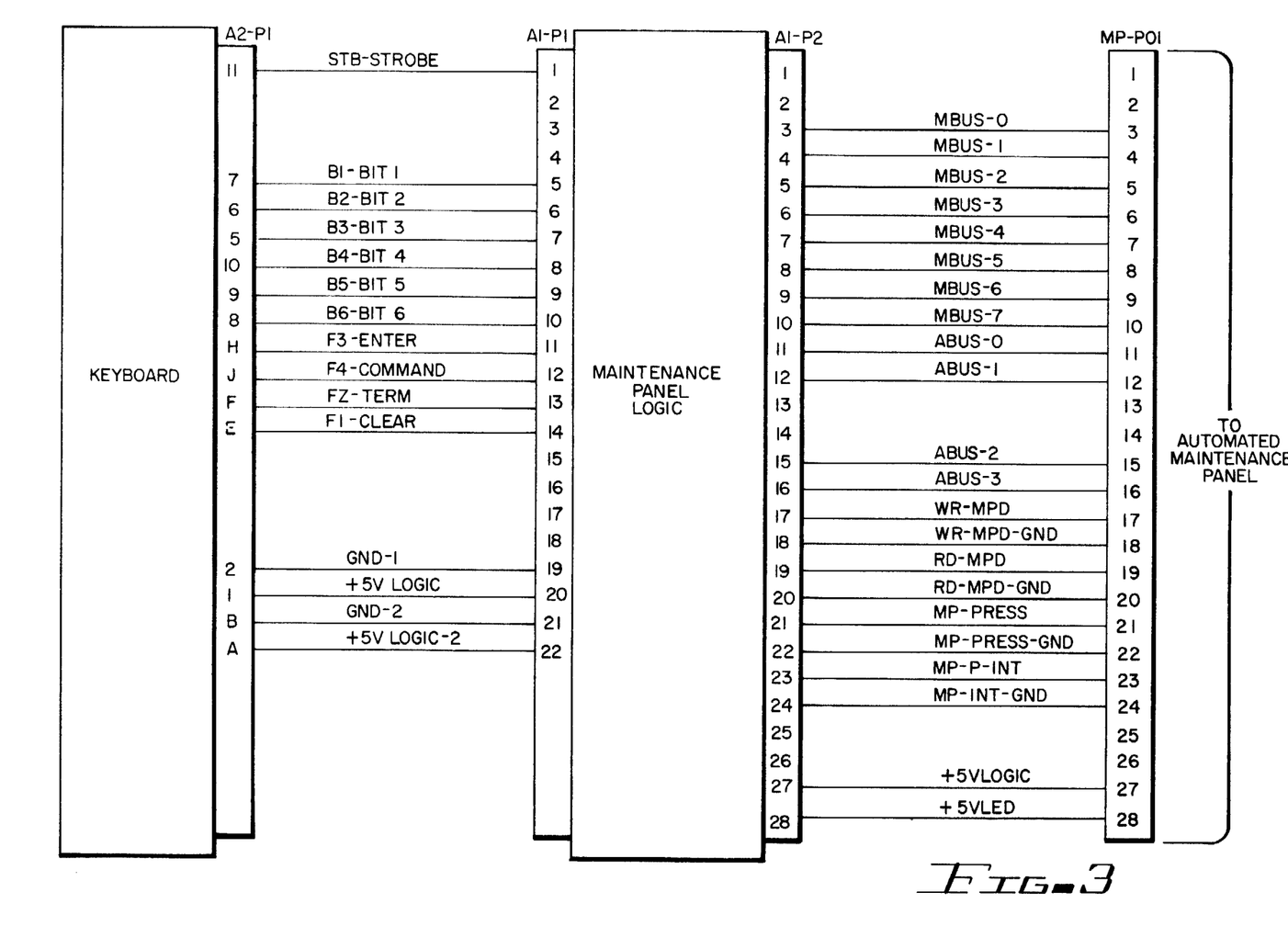
FIG. 3 is a diagram of the linkage between the keyboard, maintenance panel logic and the automated maintenance system.
Figure 4:
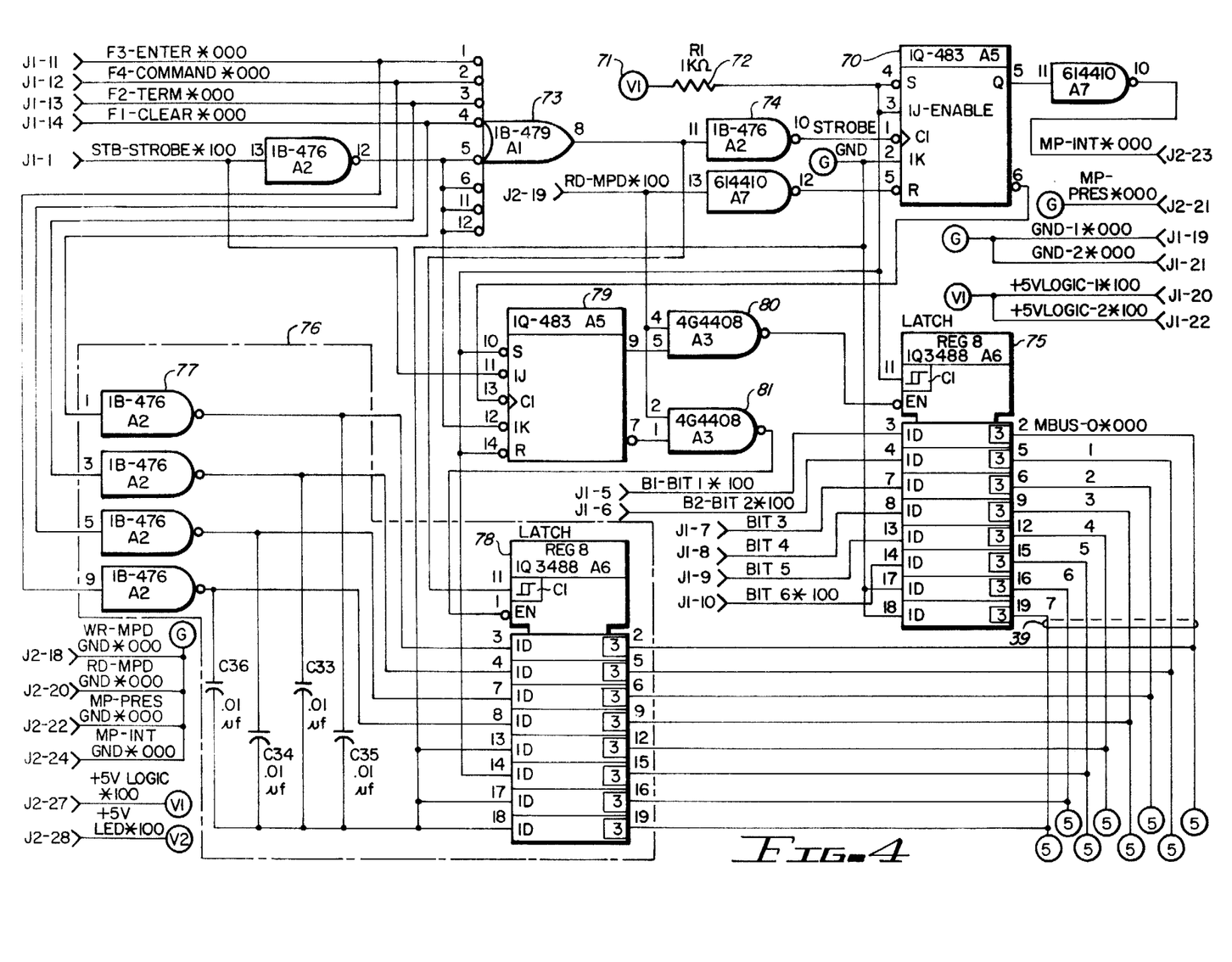
FIG. 4 is a logic diagram relating to the Function Commands from the keyboard as well as certain control signals to and from the microprocessor in the Automated Maintenance System, FIGS. 5A and 5B together form a logic diagram of the address decoders and data latch used in connection with the numeric and alphanumeric displays on the maintenance panel.

FIG. 3 shows the signals passed between the encoded keyboard and the logic board of the maintenance panel, and the signals that enter and leave the maintenance panel port from and to the automated maintenance system of FIG. 1. Turning now to a detailed description of the logic of the maintenance panel, FIG. 4 shows the details of the interface between the keyboard means and the port means. The signals F3-ENTER, F4-COMMAND, F2-TERM and F-1 CLEAR represent the signals from the four function keys "enter", "command", "terminate" and "clear". One function of the signals is to cause an interrupt to microprocessor 10 in FIG. 1 to force it to enter an interrupt routine for servicing the maintenance panel. This routine reads the data on the MBUS to determine which key has been depressed.

Generation of this interrupt request signal is the responsibility of flip flop 70 in FIG. 4. In the preferred embodiment, this flip flop and flip flop 79 is a 74LS112. This flip flop will be set when the enable input at pin 3 is high and the strobe input signal to pin 1 makes a high to low transition. This raises the Q output, pin 5, and lowers the MP-INT signal. Voltage source 71 and resistor 72 serve to keep the enabled input, pin 3, in the logical one state. The strobe input signal makes the high to low transition when any of the four function keys connected to the inputs of inverted-OR gate 73 are depressed. In the preferred embodiment, this gate is a 74 LS30. When any of signals F3-ENTER through F1-CLEAR goes low, the output of gate 73 goes high causing the output of inverter 74 to make the high to low transition thereby setting flip flop 70. The signal MP-INT then goes low signalling that the maintenance panel is requesting service.

The port for transfer of information to and from microprocessor 10 of the automated maintenance system of FIG. 1 is MBUS 39 which is comprised of the signal lines MBUS-0 through 7 of FIG. 3. Information from the data keys of the encoded alphanumeric keyboard comes in as inputs to bus driver 75 on signal lines B1—BIT1 through B6–BIT6. The outputs of this bus driver are coupled to the eight lines of the MBUS. The MBUS is also coupled to encoder network 76 which functions to convert the signal line inputs from the function keys "enter", "command", "terminate" and "clear" into a unique eight bit pattern for each key. Each pattern comprises a logical one at bit five and all zeroes on the other seven bits except for one line which corresponds to the particular key that was pressed. For example, when the "clear" key is depressed, inverter 77 raises pin 3 of latch 78. The output of this portion of the latch is coupled to bit zero of the MBUS. Thus the bit pattern on the MBUS for the "clear" function is all zeroes except for logical ones at bits zero and five. The bit patterns for the other three function keys can be similarly derived.

The MBUS must be switched between bus driver 75 and latch 78 to allow coupling of the four function keys and the alphanumeric data keys to the microprocessor. In the preferred embodiment, these devices are 74LS373's. This switching function is performed by flip flop 79 which is set when any key other than the "enter", "command", "terminate" or "clear" keys is depressed. When flip flop 79 is set, the enable input, pin 1, of bus driver 75 is driven low when the signal RD-MPD is high, thereby connecting the MBUS to the data key signal lines. When flip flop 79 is reset, pin seven goes high. This enables latch 78 when the signal RD-MPD from the microprocessor goes high by the action of NAND gate 81. The RD-MPD signal indicates the microprocessor is reading the MBUS. When latch 78 is enabled, the MBUS is coupled to the four function keys through encoder network 76. The state of flip flop 79 is controlled by the condition at the not Q output at pin six of flip flop 70 and the signal STB-STROBE from the keyboard. The latter signal assumes a one state when any of the four function keys is depressed and the opposite binary state when any of the data keys are depressed. The Q output of flip flop 79 at pin nine and the $\overline{Q}$ output at pin 7 are respectively coupled through gates 80 and 81 to the enable inputs of bus driver 75, and latch 78, Gates 80 and 81 serve to allow bus driver 75 and latch 78 to be turned on only when the microprocessor wishes to read the MBUS as indicated by the signal RD-MPD from the automated maintenance system shown in FIG. 1.

Figure 5A:
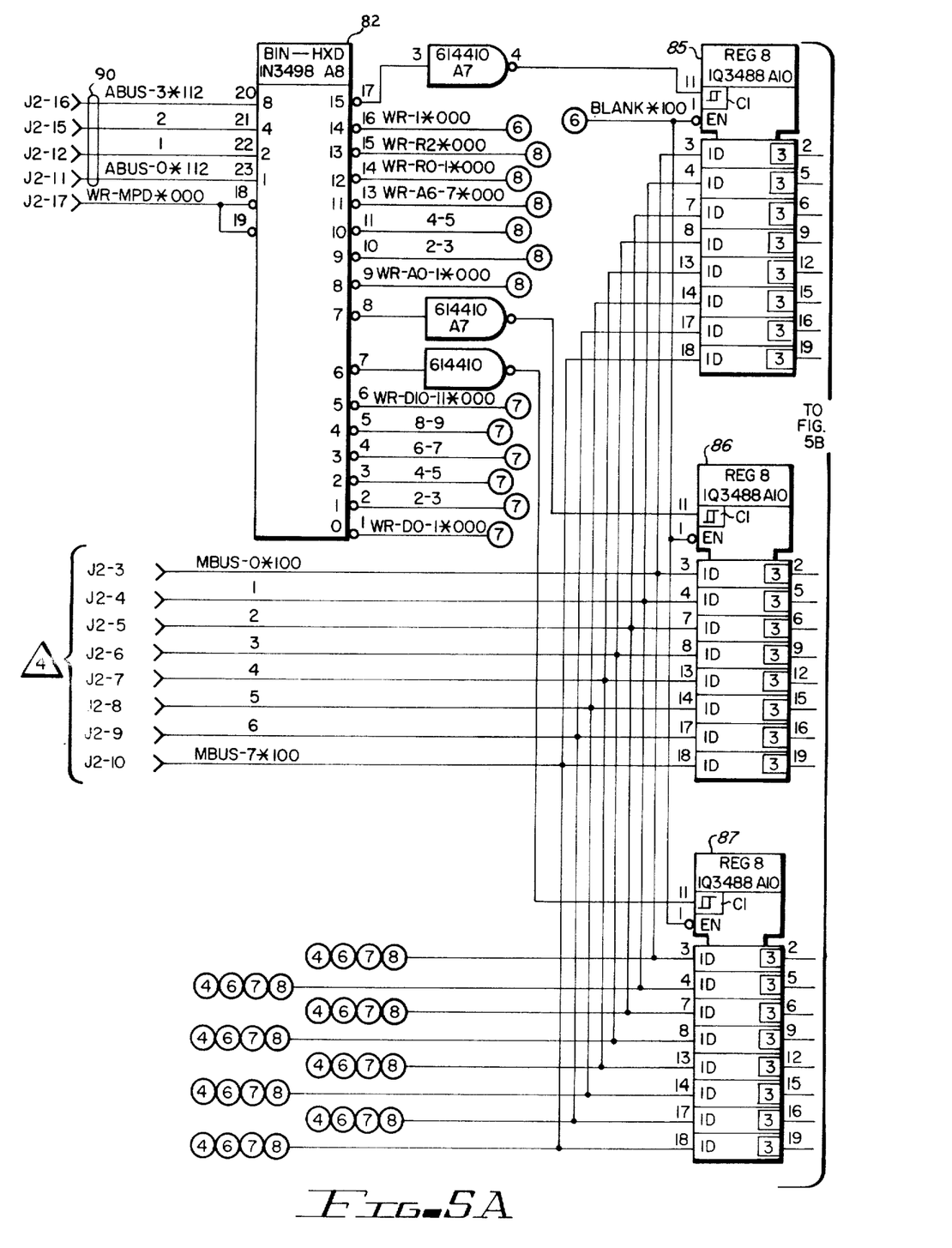

The address port and decoder means for coupling a portion of the address bus of the automated maintenance system, 90 in FIG. 1, to the display means on the maintenance panel is shown in FIG. 5A. Four-line-to-sixteen-line decoder 82 receives the signals ABUS-0 through ABUS-3 from the ABUS of the maintenance system. In the preferred embodiment, this decoder is a SN74154. This decoder converts the binary bit patterns appearing on its input pins 20, 21, 22 and 23 to single line output signals at its output pins 1–17. These output signals serve as enable and latching signals for the various display buffers shown in FIGS. 7A, 7B 8A and 8B. The signal WR-I can be found again on FIG. 6. It is seen there that this signal serves as the enable signal for octal latch 83. When the signal WR-I goes low, the enable input at pin 11 goes high, allowing the outputs on the right side of the chip to follow the inputs from the system MBUS on the left side of the chip. Signal WR-I returning to a low condition at pin 11 of the latch, latches the MBUS data. The outputs of latch 83 are coupled to the eight individual LED's serving as prompting and status indicators. Thus it is seen that the microprocessor can light any of these individual LED's by raising the appropriate bit on the MBUS.

Figure 6:
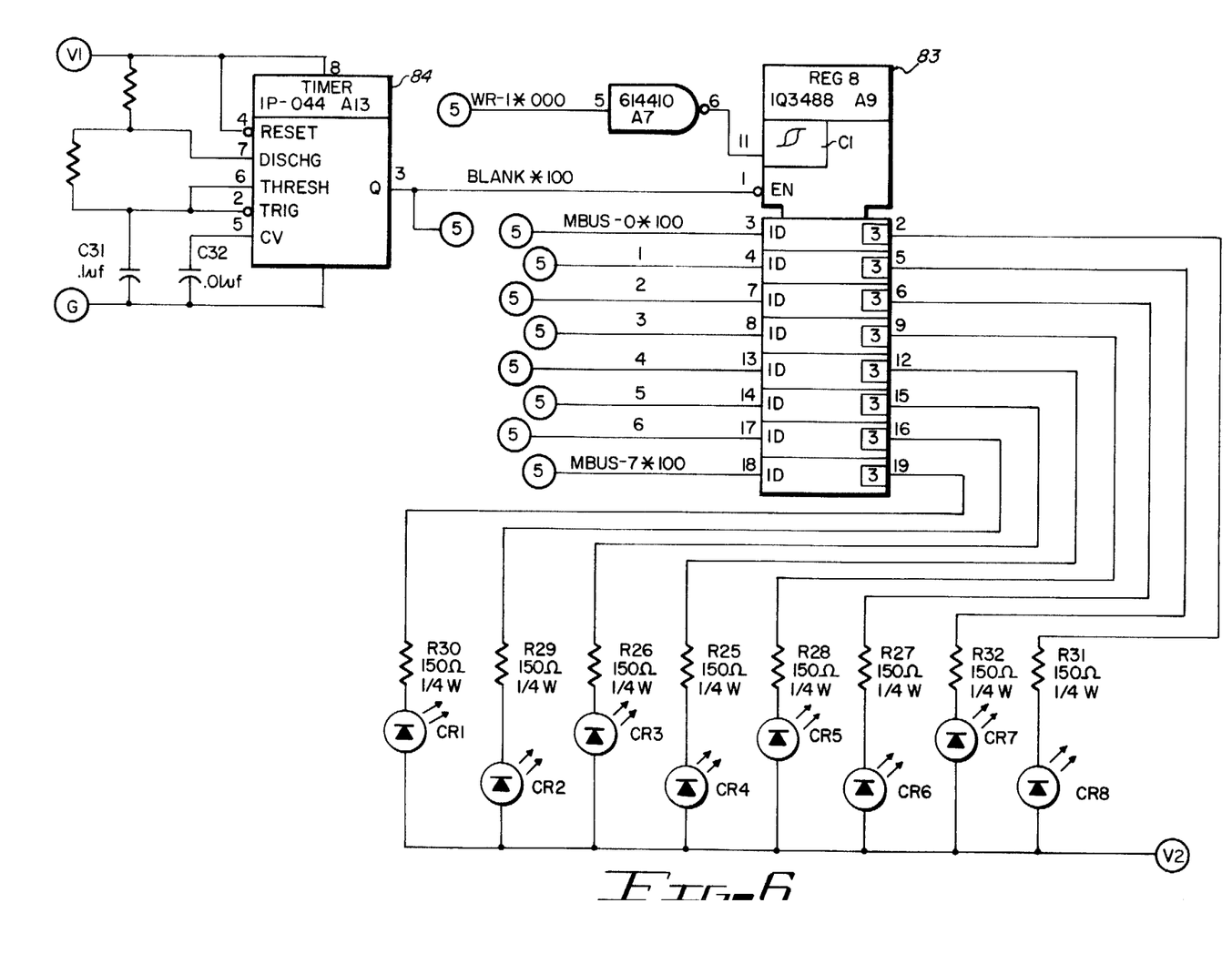
FIG. 6 is a diagram of the circuity associated with the LED display of the Maintenance Panel, FIGS. 7A, 7B and 8A and 8B together form a diagram of the circuitry of the numeric/alphanumeric display.
Figure 7A:
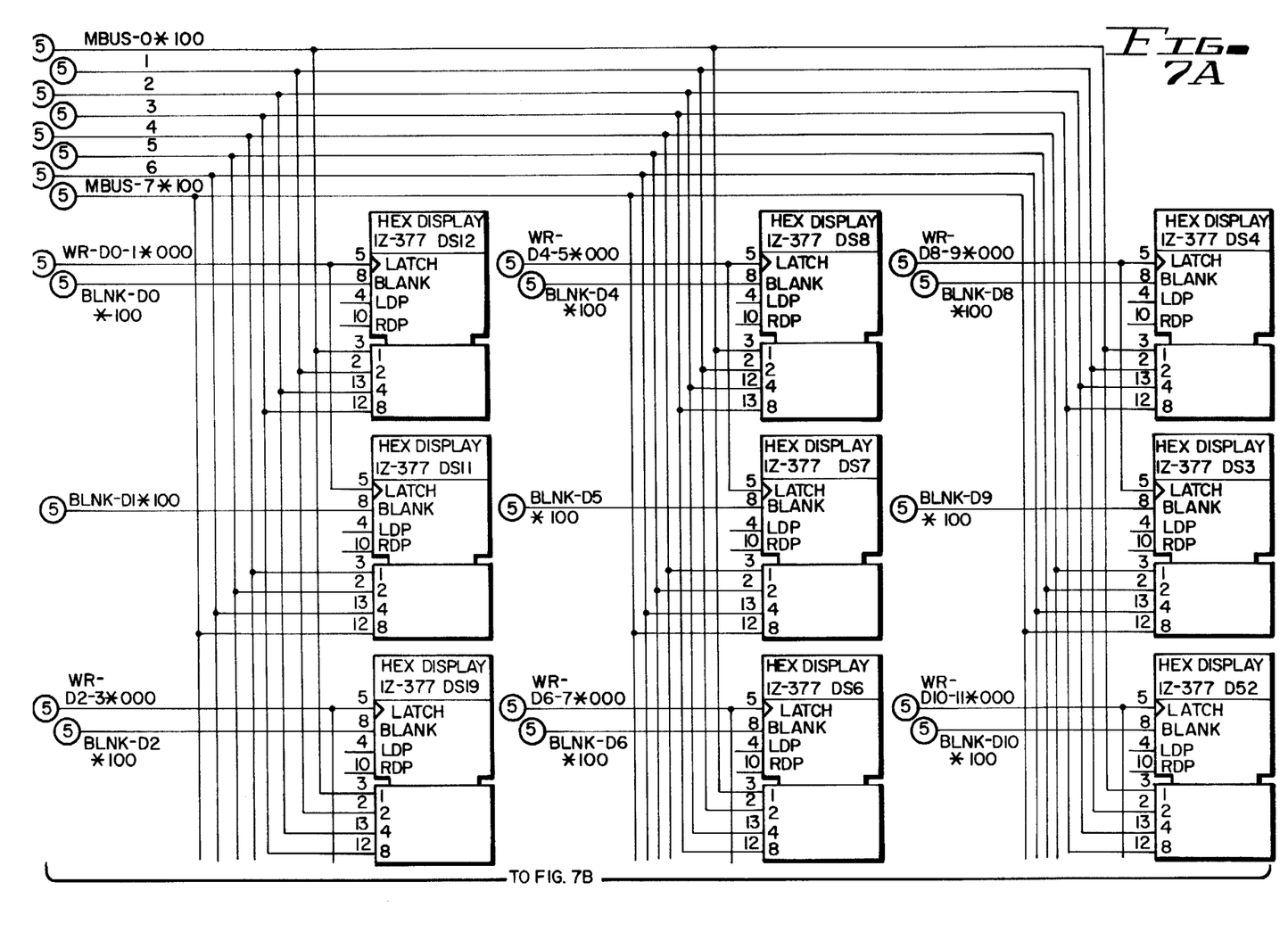
Figure 7B:
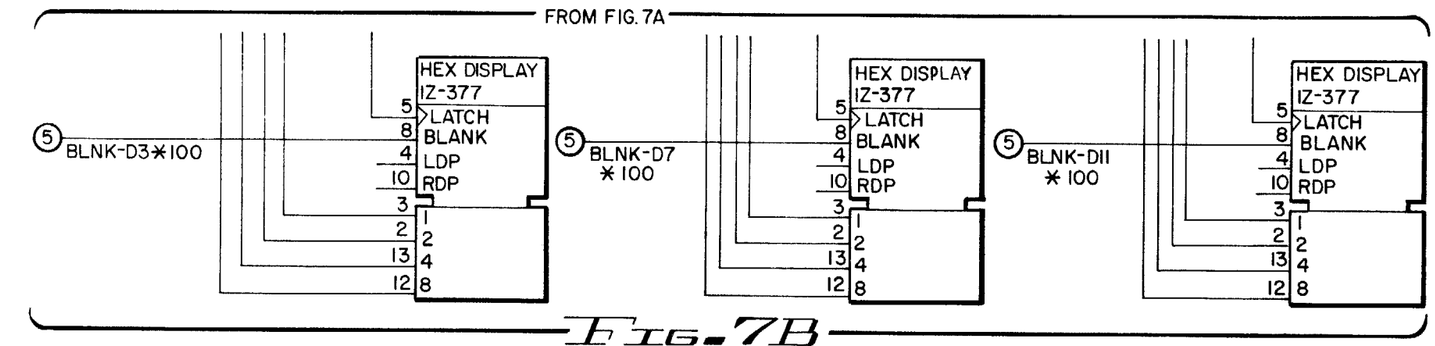
Figure 8A:
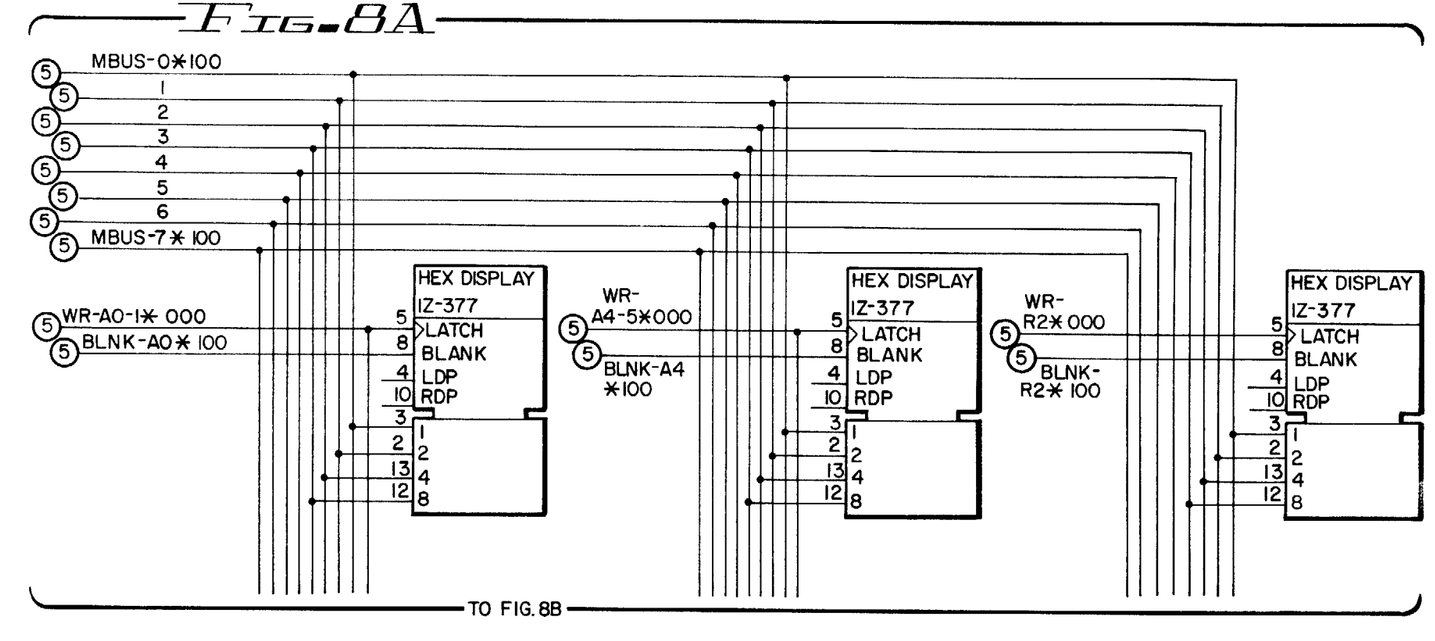
Figure 8B:
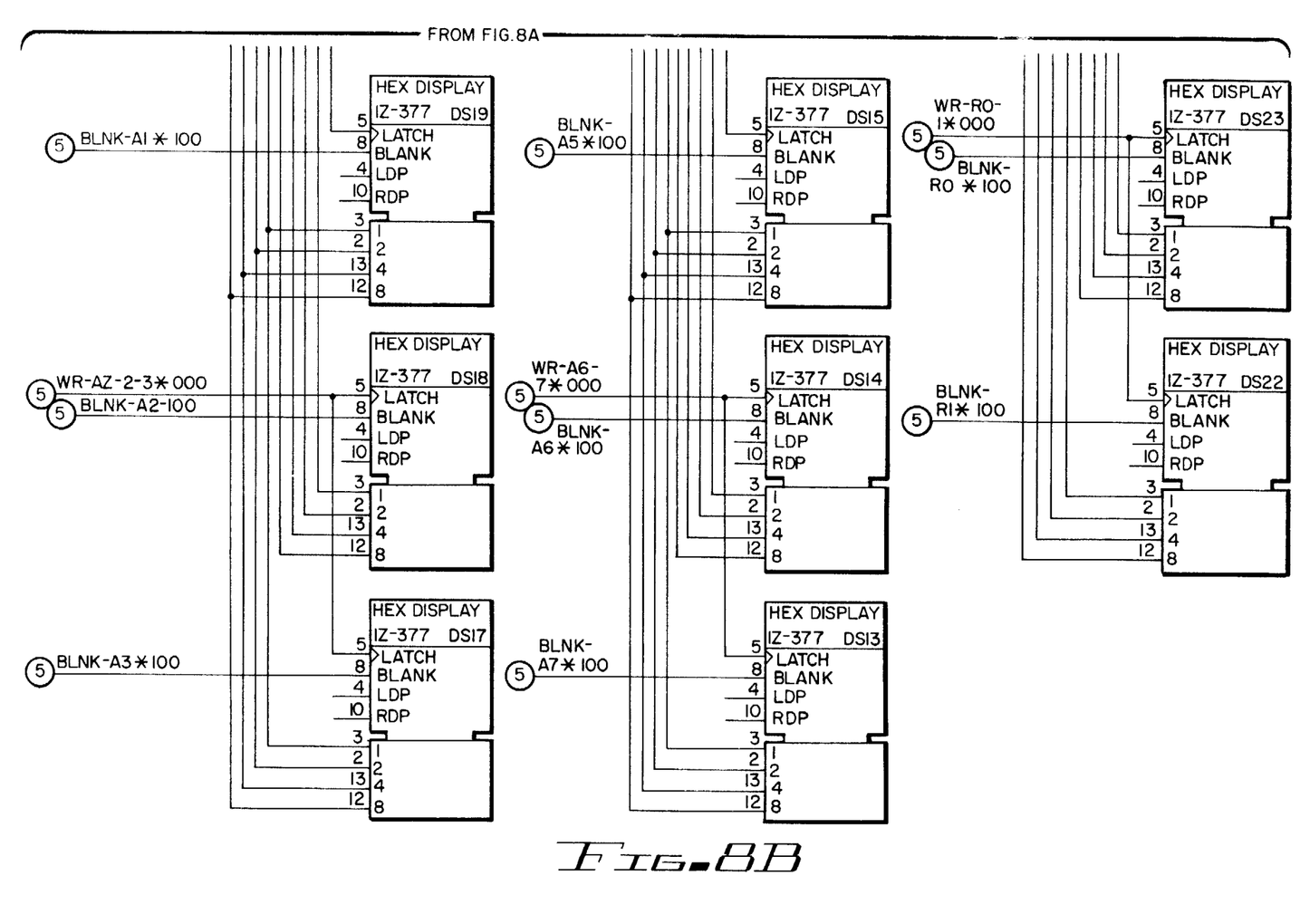

Timer 84 in FIG. 6 is connected as an oscillator such that its output signal BLANK, coupled to the pin 1 enable input of latch 83, will tri-state the output lines at the rate of 1,000 cycles per second. This causes the indicator LED's to flicker on and off at a rate too fast for the eyes to see, but serves to conserve energy used by the display means of the maintenance panel. As seen in FIG. 6, the signal BLANK also is sent to FIG. 5A where it is coupled to the pin 1 enable inputs of the three octal latches 85, 86 and 87. Again, this signal serves to tri-state the output of these latches as in FIG. 6. The outputs of these latches go to FIGS. 7A, 7B, 8A and 8B to control the hex display buffers shown there.

As in the case of latch 83 in FIG. 6, the input to latches 85, 86 and 87 are the bits 0-7 of the MBUS.

Figure 5B:
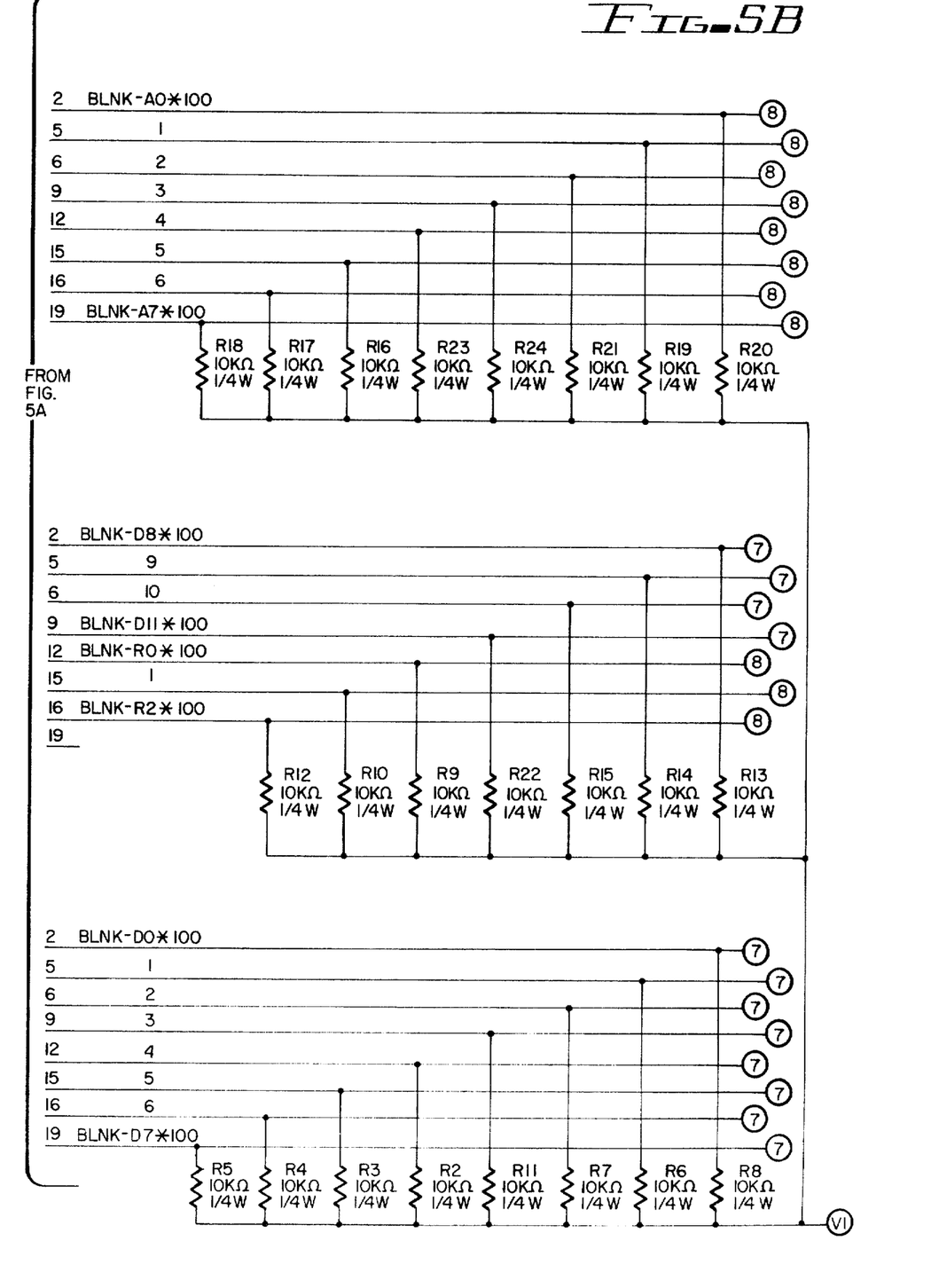

The blanking outputs from latches 85, 86 and 87 serve to blank the hex display buffers shown in FIGS. 7A, 7B, 8A and 8B. Likewise, the output signals from four-line-to-sixteen-line decoder 82 serve as the latching signals for these same hex display buffers. These hex display buffers will display a hexadecimal figure from zero through F depending upon the bit pattern at their input pins 3, 2, 12 and 13. As seen in FIGS. 7A, 7B, 8A and 8B, these input pins are coupled to bits 0-7 of the system MBUS. When microprocessor 10 wishes to write data into a particular pair of hex display buffers on the maintenance panel, it writes the desired bit pattern on the MBUS bits 0-7. Simultaneously, it writes the correct address via bits 0-3 on the system ABUS. This causes four-line-to-sixteen-line decoder 82 in FIG. 5A to lower one of its outputs which is coupled to the latch input at pin 5 of the desired hex display buffer pairs. This causes the hex display buffers to light their displays with the desired characters. When a display must be blanked so that new data may be displayed, microprocessor 10 writes the correct information on to the system MBUS, causin one of latches 85, 86 and 87 to raise the blank input of the desired hex display buffer at pin 8 via one of the BLNK signals of FIG. 5B thereby blanking out the information. New information can be written to this hex display buffer and a new latch signal sent to it while the display is blanked.

Although the invention has been described in terms of the preferred embodiment disclosed herein, it will be obvious to those skilled in art that many variations are possible whereby the same function may be accomplished in a similar method using similar means. These variations are intended to be included in the scope of the invention.

What is claimed is:

1. A maintenance panel apparatus for communicating with an automated maintenance system for testing a preselected unit in a data processing system, said maintenance system including means for transmitting information to and receiving information from said data processing system under test, said apparatus comprising:
   (a) a keyboard means for entering address, data, command and control information to be transferred to said automated maintenance system to control the function of said automated maintenance system;
   (b) a display means to display address, data, command, and control information entered by said keyboard means for transfer to said automated maintenance system, and for display of address, data, and command information received by said automated maintenance system from said unit of said data processing system under test; and,
   (c) a port means coupled to said keyboard means, to said display means, and to said automated maintenance system for the transfer of address, data, command, and control informtion to said automated maintenance system, and for the transfer of address, data, and command information received by said automated maintenance system from said preselected unit of said data processing system to said display means, said display means including means to display system conditions status information from said automated maintenance system.

2. A maintenance panel apparatus for communicating with an automated maintenance system for testing a preselected unit in a data processing system, as recited in claim 1, wherein said keyboard means further comprises:
   (a) a keyboard for entering address, data, and command information to be transferred to said automated maintenance system to control the functions of said automated maintenance system;
   (b) a plurality of function keys for entering control information to be transferred to said automated maintenance system to control the functions of said automated maintenance system, each function key having a single line output.
   (c) an encoding means coupled to said single line output from said plurality of function keys for converting each of said single line outputs to a unique binary code for transfer to said automated maintenance system; and,
   (d) means coupled to said keyboard and to said plurality of function keys for generating a signal to said automated maintenance system to indicate that said maintenance panel apparatus is ready to transfer information to said automated maintenance system.

3. A maintenance panel apparatus for communicating with an automated maintenance system for testing a preselected unit in a data processing system, as recited in claim 1, wherein said display means further comprises:
   (a) a plurality of alpha-numeric display means coupled to said port means to display address, data, and command information entered by said keyboard means for transfer to said automated maintenance system, and for display of address, data and command information received by said automated maintenance system from said unit of said data processing system under test; and,
   (b) a plurality of single light emissive devices coupled to said port means to display status information of said automated maintenance system.

4. A maintenance panel apparatus for communicating with an automated maintenance system for testing a preselected unit in a data processing system as recited in claim 1, wherein said port means further comprises:
   (a) a data port means coupled to said keyboard means and to said display means for transferring address, data, command and control information between said maintenance panel apparatus and said automated maintenance system; and,
   (b) an address port means coupled to said display means and to said automated maintenance system for transferring to said display means information specificying to which of said display means the said address, data, command and control information present on said data port means is directed.

5. A maintenance panel apparatus for communicating with an automated maintenance system for testing a preselected unit in a data processing system, said maintenance system including means for transmitting information to and receiving information from said data processing system under test said apparatus comprising:
   (a) a keyboard for entering address, data, and command information to be transferred to said automated maintenance system to control the functions of said automated maintenance system;
   (b) a plurality of function keys for entering control information to be transferred to said automated maintenance system to control the functions of said automated maintenance system, each function key having a single line output;

(c) an encoding means coupled to said single line outputs from said plurality of function keys for converting each of said single line outputs to a unique binary code for transfer to said automated maintenance system;

(d) means coupled to said keyboard and to said plurality of function keys for generating a signal to said automated maintenance system to indicate that said maintenance panel apparatus is ready to transfer information to said automated maintenance system;

(e) a plurality of display means to display address, data, and command information entered by said keyboard and control information entered by said plurality of function keys for transfer to said automated maintenance system, and for display of address, data, and command information received by said automated maintenance system from said preselected unit of said data processing system under test, and condition status information of said automated maintenance system;

(f) a data port means coupled to said automated maintenance system, to said keyboard, to said encoding means, and to said plurality of display means for transferring address, data, command and control information between said maintenance panel apparatus and said automated maintenance system;

(g) an address port means coupled to said plurality of display means and to said automated maintenance system for transferring to said plurality of display means information specifying to which of said display means the said address, data, command and control information present on said data port means is directed; and, (h) address decoding means coupled to said plurality of display means and to said address port means for selecting which display of said plurality of displays is to display the address, data, command and condition status from said automated maintenance system.

6. A maintenance panel apparatus for communicating with an automated maintenance system for testing a preselected unit in a data processing system, as recited in claim 5, wherein said plurality of display means further comprises:

(a) a plurality of alpha-numeric display means coupled to said port means to display address, data, and command information entered by said keyboard for transfer to said automated maintenance system, and for display of address, data and command information received by said automated maintenance system from said preselected unit of said data processing system under test; and (b) a plurality of single light emissive devices coupled to said port means to display status information of said automated maintenance system.

* * * * *